March 10, 1931. T. L. DAWKINS 1,796,005
STOP SIGNAL
Filed Aug. 12, 1930 2 Sheets-Sheet 1
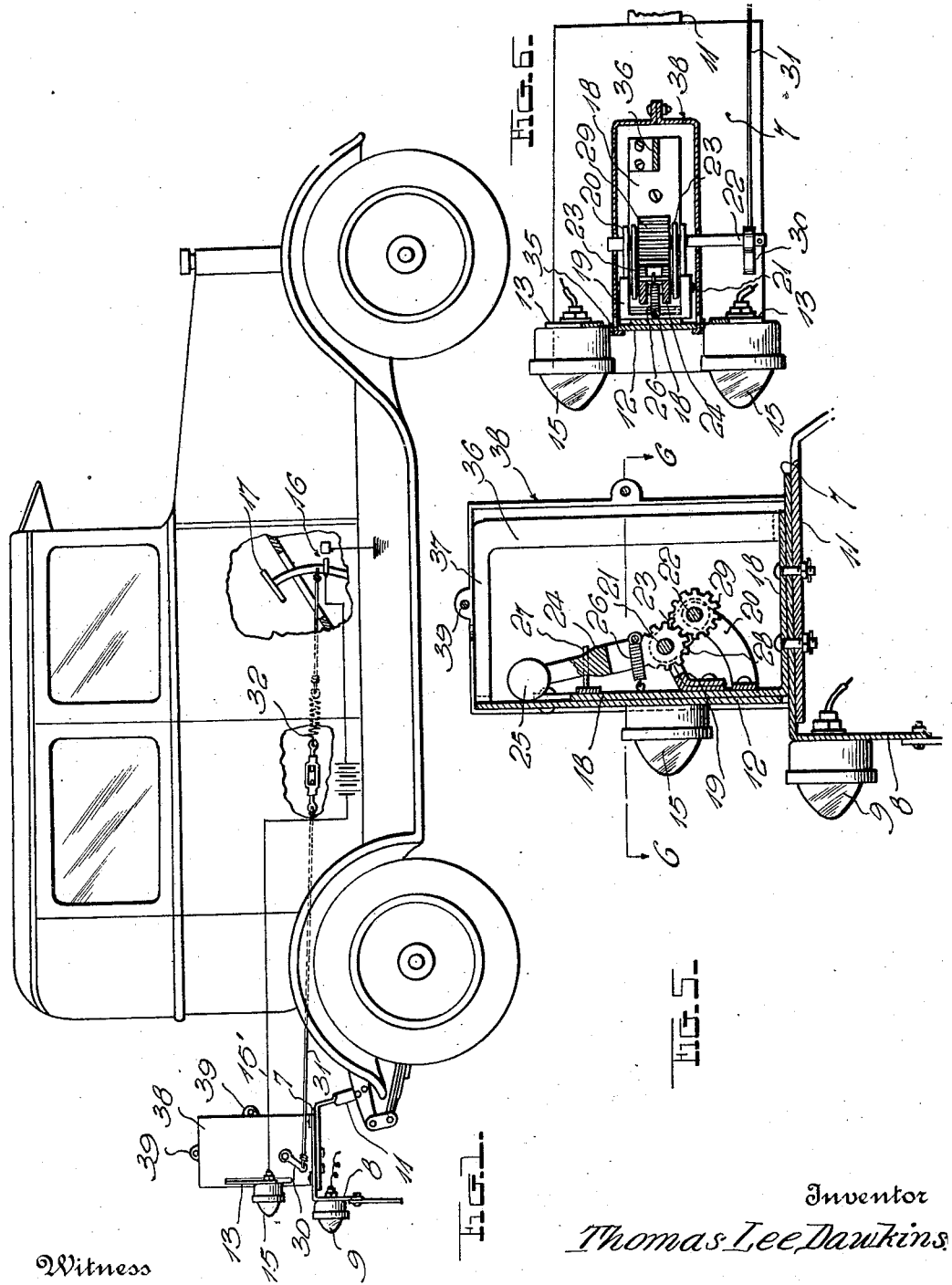
Inventor
*Thomas Lee Dawkins*
Witness
*H. Woodard*
By *H. B. Willson Yeo*
Attorneys.

March 10, 1931. T. L. DAWKINS 1,796,005
STOP SIGNAL
Filed Aug. 12, 1930 2 Sheets-Sheet 2
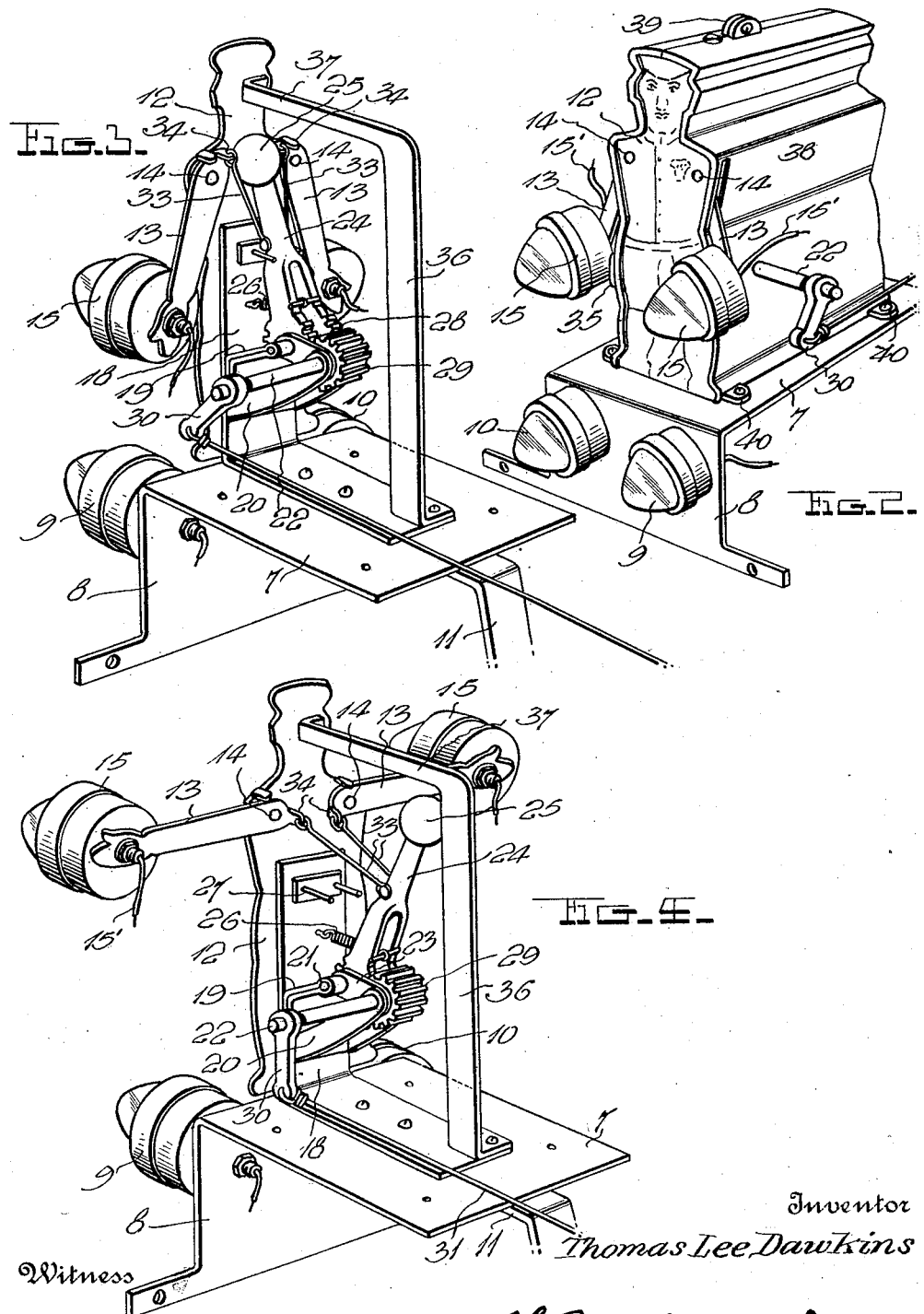

Patented Mar. 10, 1931

1,796,005

UNITED STATES PATENT OFFICE

THOMAS LEE DAWKINS, OF SANTA BARBARA, CALIFORNIA

STOP SIGNAL

Application filed August 12, 1930. Serial No. 474,828.

The invention aims to provide a new and improved stop signal for all types of motor vehicles, of such form as to be unusually conspicuous and hence of maximum efficiency in signalling whenever a stop is to be made. The signal embodies normally lowered signalling arms which preferably form portions of a simulation of a traffic officer, and through suitable operating connections, these arms are raised when the brake of the machine is applied to either check the speed of the vehicle or to bring the latter so a standstill. The signalling arms carry lights which may be either provided with illuminating bulbs or may be of a known type to be illuminated by rays of light from the headlights of other machines behind that carrying the invention.

With the foregoing and additional objects in view, which will become apparent as the description proceeds, the invention resides in the novel subject matter hereinafter described and claimed, description being accomplished by reference to the accompanying drawings.

Fig. 1 is a side elevation partly broken away, showing the application of the invention to an automobile, the wiring and switch for the signal lights being diagrammatically shown.

Fig. 2 is a perspective view of the stop signal separate from the machine.

Fig. 3 is a perspective view of the signal with the casing removed, the signal arms being lowered.

Fig. 4 is a view similar to Fig. 3 but showing the signal arms raised.

Fig. 5 is a central vertical longitudinal sectional view showing the various parts in their normal positions.

Fig. 6 is a horizontal sectional view on line 6—6 of Fig. 5.

A preferred construction has been illustrated and will be rather specifically described, with the understanding that within the scope of the invention as claimed, variations may be made.

The numeral 7 on the drawings denotes a horizontal base plate for supporting the stop signal, said base plate being preferably integral with and projecting forwardly from a license plate bracket 8, said bracket carrying a tail light 9 and a backing light 10. 11 merely denotes a suitable attaching arm or the like carrying the plate 7 and the bracket 8.

Rising rigidly from the rear end of the base plate 7, is a vertically elongated plate 12 preferably shaped and painted to simulate a traffic or other officer. Two signal arms 13 which normally occupy the lowered positions shown in Figs. 2 and 3, are pivoted at their upper ends to the shoulder portions of the plate 12 as denoted at 14, said arms being provided with lights 15 which may be either provided with illuminating bulbs or may be of a type to be illuminated by the headlights of other machines. In the present showing, bulbs are provided for the lights 15 and wiring 15' is employed for conducting current to said bulbs from the usual automobile battery, said wiring being provided with a switch 16 operatively connected with the brake pedal 17. Through the provision of means hereinafter described, when this pedal is depressed, the arms 13 swing upwardly to the position shown in Fig. 4 and at the same time, the switch 16 closes to effect illumination of the signal lights 15.

In securing the plate 12 to the base plate 7, I prefer to provide a rigid right angular bracket 18 whose vertical portion is secured to said plate 12 while its horizontal portion is secured upon the plate 7. Secured to the vertical part of the bracket 18, are two brackets 19 and 20 which carry relatively short and long rock shafts 21 and 22 respectively, said shafts being horizontally disposed and having their axes parallel with the plane in which plate 12 is positioned. Preferably, links 23 connect the two shafts 21 and 22 with each other, holding them in fixed relation even should the brackets 19 and 20 yield somewhat.

Mounted upon the shaft 21 is an upstanding operating arm 24 which is swingable away from the plate 12 to effect upward swinging of the signal arms 13. The upper end of arm 24 is provided with a bumper 25 of rubber or other yieldable material, said bumper normally lying against the plate 12 and engaging the upper ends of the arms 13, as shown in Figs. 3 and 5. A spring 26 normally holds the arm 24 in the position shown in these views and hence the single bumper 25 will prevent rattling of the three arms 13, 13 and 24. By preference, arm 24 is normally received between two bracing pins 27 carried by the vertical part of the bracket 18, tending to hold said arm 24 against any chattering in directions transverse to the plane in which said arm is swingable.

The lower end of arm 24 is provided with segments 28 meshing with a pinion 29 secured to the shaft 22, this shaft being provided with a crank arm 30 connected by a line 31 with the brake pedal 17. This line 31 preferably embodies a spring 32 which allows further movement of the brake pedal after the line has been pulled to effect turning of the pinion 29, swinging of the arm 24 and upward swinging of the arms 13, these arms 13 being operatively connected with the operating lever 24, by pull links 33. The arms 13 are provided with lugs 34 to which the links 33 are loosely connected, and the bumper ball 25 is normally received snugly between these lugs and then engages the plate 12. Additional bumpers 35 are preferably employed to cushion the downward swinging of the arms 13.

Spaced outwardly from the pinion 29 in a direction away from the plate 12, is a brace standard 36 which is rigidly secured to the base 7. The upper end 37 of this standard is horizontally turned and secured to the upper end of the plate 12 to rigidly brace the latter. In addition to performing this bracing function, the standard 36 co-acts with the bumper ball 25 in limiting the movement of the arm 24 when the latter is swung to effect upward swinging of the signal arms 13 (see Fig. 4). Not only is the movement of parts limited by striking of the bumper 25 against the standard 36, but as these parts are brought to rest, they are cushioned, so that there is no noise created and moreover no injurious shock.

To enclose most working parts of the device, a suitable casing 38 is provided. This casing is preferably formed of two halves secured together by suitable means 39 and secured to the base by appropriate means 40.

It will be seen from the above that whenever the brake is applied, the pull line 31 is operated. This line, through the instrumentality of the crank arm 30 turns the shaft 22 and the pinion 29, and the latter turns the segments 28 to swing the operating arm 24 away from the plate 12 until the bumper 25 strikes the standard 36. In moving in this manner, arm 24 pulls upon the links 33, thereby pulling downwardly upon the upper ends of the arms 13 and causing the major portions of these arms to swing upwardly. About the time the pull line 31 starts to swing the arms 13 upwardly, the switch 16 closes and the lights 15 are illuminated. These illuminated lights can thus be seen describing arcs from their lowered to their raised positions, with the result that an unusually conspicuous stop signal is given, adding greatly to the safety of the occupants of the machine carrying the invention, and to occupants of following machines. As soon as the brake pedal is released, the weight of the lights 15 and the action of the spring 26, return the parts to normal position, the bumper 25 then engaging the lugs 34 of the arms 13 as well as engaging the plate 12, and hence preventing rattling which might otherwise take place.

While a preferred construction has been shown and described as above stated, attention is again invited to the fact that within the scope of the invention as claimed, variations may be made.

I claim:—

1. A stop signal comprising a vertically elongated plate, two upwardly swingable signal arms pivoted to said plate near their upper ends, an upstanding operating arm pivotally mounted to swing away from said plate, operating connections between said operating arm and said signal arms, means for swinging said arm away from said plate to raise said signal arms, a bumper on the upper end of said operating arm normally resting against said plate, and a fixed stop at the end of the outward path of said bumper to limit the movement of the three arms.

2. A stop signal comprising a vertically elongated plate, two upwardly swingable signal arms pivoted to said plate near their upper ends, an upstanding operating arm pivotally mounted to swing away from said plate, operating connections between said operating arm and said signal arms, means for swinging said operating arm away from said plate, and a bumper on the upper end of said operating arm, said signal arms having portions normally engaged by said bumper to prevent rattling of said arms.

3. A stop signal comprising a base, a vertically elongated plate rising rigidly from said base, a standard rising rigidly from said base in inwardly spaced relation with said plate, said standard having a horizontally turned upper end secured to the upper portion of said plate, a pair of normally lowered upwardly swingable signal arms pivoted to said plate, an upstanding operating arm operatively connected with said signal arm, means for swinging said operating arm to upwardly swing said signal arms, and a bumper on the upper end of said operating arm, said bumper being adapted to strike said standard when said operating arm is swung to raise said signal arms, said bumper being adapted to strike a relatively stationary part of the device when the operating arm returns to normal.

4. A stop signal comprising a base, a vertically elongated plate rising rigidly from said base, a standard rising rigidly from said base in inwardly spaced relation with said plate, said standard having a horizontally turned upper end secured to the upper portion of said plate, a pair of normally lowered upwardly swingable signal arms pivoted to said plate, an upstanding operating arm operatively connected with said signal arm, means for swinging said operating arm to upwardly swing said signal arms, and a bumper on the upper end of said operating arm, said bumper being adapted to strike said standard when said operating arm is swung to raise said signal arms, said signal arms having portions normaly engaged by said bumper to hold the arms against rattling.

5. A stop signal comprising a vertically elongated plate, two upwardly swingable signal arms pivoted to said plate near their upper ends, an upstanding operating arm pivotally mounted to swing away from said plate, operating connections between said operating arm and said signal arms, means for swinging said arm away from said plate to raise said signal arms, and a bumper on the upper end of said operating arm normally resting against said plate.

6. A stop signal comprising a vertically elongated plate, two upwardly swingable signal arms pivoted to said plate near their upper ends, an upstanding operating arm pivotally mounted to swing away from said plate, operating connections between said operating arm and said signal arms, and a fixed stop at the end of the outward path of said operating arm to limit the movement or the three arms.

In testimony whereof, I affix my signature.

THOMAS LEE DAWKINS.